US012652365B2

(12) United States Patent
He

(10) Patent No.: US 12,652,365 B2
(45) Date of Patent: Jun. 9, 2026

(54) IMAGE PROCESSING METHOD AND APPARATUS, AND READABLE STORAGE MEDIUM

(71) Applicant: Beijing Zitiao Network Technology Co., Ltd., Beijing (CN)

(72) Inventor: Siyu He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 123 days.

(21) Appl. No.: 18/572,743

(22) PCT Filed: Jul. 20, 2022

(86) PCT No.: PCT/CN2022/106751
§ 371 (c)(1),
(2) Date: Dec. 20, 2023

(87) PCT Pub. No.: WO2023/001188
PCT Pub. Date: Jan. 26, 2023

(65) Prior Publication Data
US 2024/0291937 A1 Aug. 29, 2024

(30) Foreign Application Priority Data
Jul. 21, 2021 (CN) .......................... 202110824605.2

(51) Int. Cl.
*H04N 5/272* (2006.01)
*G06T 3/60* (2024.01)
(Continued)

(52) U.S. Cl.
CPC .............. *H04N 5/272* (2013.01); *G06T 3/60* (2013.01); *G06T 11/60* (2013.01); *H04N 5/2628* (2013.01)

(58) Field of Classification Search
CPC ........... G06T 11/60; G06T 3/60; H04N 5/272; H04N 5/2628
See application file for complete search history.

(56) References Cited

U.S. PATENT DOCUMENTS 6,211,913 B1 4/2001 Hansen et al.
7,305,146 B2 12/2007 Cheatle
(Continued)

FOREIGN PATENT DOCUMENTS

CN 101309389 A 11/2008
CN 105096354 A 11/2015
(Continued)

OTHER PUBLICATIONS

Notice of Refusal for Japanese Application No. 2023-579176, mailed Nov. 26, 2024, 6 pages.
(Continued)

*Primary Examiner* — Jin Cheng Wang
(74) *Attorney, Agent, or Firm* — BakerHostetler

(57) ABSTRACT

The present disclosure relates to an image processing method and apparatus, and a readable storage medium. The method includes: acquiring a rotation instruction for a current video frame that is inputted by a user, wherein the rotation instruction comprises a rotation angle; acquiring, in accordance with the rotation angle, a scaling parameter, and performing, according to the scaling parameter, scaling processing on an original background video frame corresponding to the current video frame to acquire a candidate video frame; and cutting-out a target background video frame from the candidate video frame, and filling a background canvas area with the target background video frame. In the present solution, two first vertexes on one diagonal line of the target background video frame are located on an edge of the candidate video frame, and two first vertexes on the other diagonal line are located inside the candidate video frame.

20 Claims, 3 Drawing Sheets

(51) Int. Cl.
  *G06T 11/60*   (2026.01)
  *H04N 5/262*   (2006.01)

(56)     References Cited

U.S. PATENT DOCUMENTS

| | | | |
|---|---|---|---|
| 9,843,729 B2 * | 12/2017 | Nichols ................. | H04N 23/635 |
| 2007/0060345 A1 | 3/2007 | Edwards | |
| 2013/0055087 A1 * | 2/2013 | Flint ...................... | G11B 27/34 |
| | | | 715/723 |
| 2013/0318471 A1 | 11/2013 | Freyhult et al. | |
| 2014/0140677 A1 * | 5/2014 | Cho ....................... | H04N 5/772 |
| | | | 386/230 |
| 2015/0249793 A1 * | 9/2015 | Nichols ................. | H04N 23/61 |
| | | | 348/239 |
| 2015/0341536 A1 * | 11/2015 | Huang ................... | G04B 47/06 |
| | | | 348/208.2 |
| 2017/0345193 A1 * | 11/2017 | Peterson ................ | G06T 11/80 |
| 2023/0289918 A1 | 9/2023 | Wu et al. | |

FOREIGN PATENT DOCUMENTS

| | | |
|---|---|---|
| CN | 108650542 A | 10/2018 |
| CN | 110309721 A | 10/2019 |
| CN | 111683282 A | 9/2020 |
| CN | 113010081 A | 6/2021 |
| JP | 2006245726 A | 9/2006 |
| JP | 2010-061338 A | 3/2010 |
| WO | 2014031830 A1 | 2/2014 |
| WO | WO 2016/022205 A1 | 2/2016 |

OTHER PUBLICATIONS

Communication Pursuant to Rules 70(2) and 70a(2) EPC for European Application No. 22845353.6, mailed Oct. 22, 2024, 1 page.
Extended European Search Report for European Application No. 22845353.6, mailed Oct. 4, 2024, 16 pages.
International Patent Application No. PCT/CN2022/106751; Int'l Written Opinion and Search Report; dated Sep. 23, 2022; 6 pages.
"Image rotation"; https://blog.csdn.net/wenjin359/article/details/84063257; CSDN; Nov. 2018; accessed Mar. 13, 2024; 8 pages.
China Patent Application No. 202110824605.2; Office Action; dated Feb. 26, 2026; 18 pages.

\* cited by examiner

Acquiring a rotation instruction for a current video frame that is inputted by a user, wherein the rotation instruction comprises a rotation angle    S101

Acquiring, in accordance with the rotation angle, a scaling parameter which is used for performing scaling processing on an original background video frame corresponding to the current video frame to acquire a candidate video frame    S102

Cutting-out a target background video frame from the candidate video frame, and filling a background canvas area with the target background video frame; wherein two first vertexes on one diagonal line of the target background video frame are located on an edge of the candidate video frame, and two first vertexes on the other diagonal line of the target background video frame are located inside the candidate video frame    S103

Fig.1

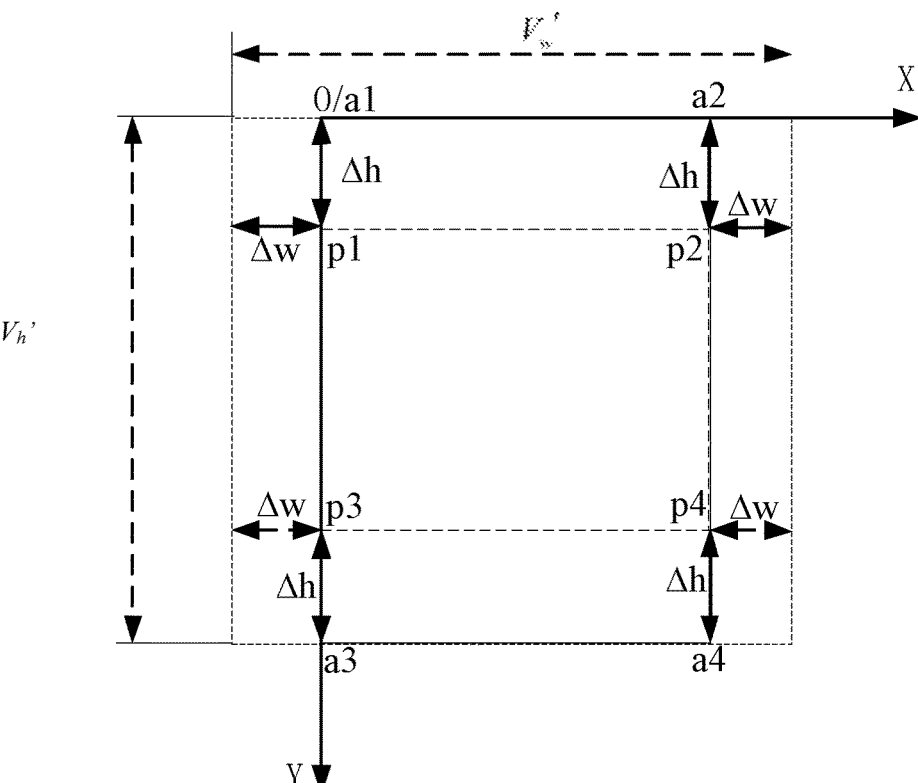

IMAGE PROCESSING METHOD AND APPARATUS, AND READABLE STORAGE MEDIUM

CROSS-REFERENCE TO RELATED APPLICATIONS

This application is a U.S. National Stage under 35 U.S.C. § 371 of International Application No. PCT/CN2022/106751, as filed on Jul. 20, 2022, which is based on and claims the priority to the Chinese Patent Application No. 202110824605.2 entitled "IMAGE PROCESSING METHOD AND APPARATUS, AND READABLE STORAGE MEDIUM" filed on Jul. 21, 2021. The disclosure of each of these applications is incorporated herein by reference in its entirety.

TECHNICAL FIELD

The present disclosure relates to the technical field of image processing, and in particular, to an image processing method and apparatus, and a readable storage medium.

BACKGROUND

With the continuous development of Internet technology, ways of video creation continuously change. At present, a user often selects an application (APP) for video creation. In video creation, the user can add a background effect to a video by using a background function provided by the APP. Herein, the process of adding the background effect to the video content by using the background function of the APP is as follows: firstly, determining background content, then performing corresponding effect processing on the background content, such as blurring processing or the like, and then performing a superposition display with respect to the background content after the effect processing and the video content.

SUMMARY

The present disclosure provides an image processing method and apparatus, and a readable storage medium.

In a first aspect, the present disclosure provides an image processing method, comprising: acquiring a rotation instruction for a current video frame that is inputted by a user, wherein the rotation instruction comprises a rotation angle; acquiring, in accordance with the rotation angle, a scaling parameter which is used for performing scaling processing on an original background video frame corresponding to the current video frame to acquire a candidate video frame; and cutting-out a target background video frame from the candidate video frame, and filling a background canvas area with the target background video frame; wherein two first vertexes on one diagonal line of the target background video frame are located on an edge of the candidate video frame, and two first vertexes on the other diagonal line of the target background video frame are located inside the candidate video frame.

In some possible designs, the cutting-out a target background video frame from the candidate video frame comprises:

acquiring a position of each of the first vertexes of the target background video frame in the candidate video frame in accordance with the rotation angle; and

cutting-out the target background video frame from the candidate video frame in accordance with the position of each of the first vertexes in the candidate video frame.

In some possible designs, the acquiring a position of each of the first vertexes of the target background video frame in the candidate video frame in accordance with the rotation angle comprises:

performing a remainder operation on the rotation angle to acquire a remainder; and acquiring coordinates of each of the first vertexes in a two-dimensional rectangular coordinate system in accordance with a relation among the remainder, a length and a width of the background canvas area, a length and a width of the candidate video frame, a first variable, and a second variable, wherein the two-dimensional rectangular coordinate system is established in accordance with the candidate video frame; and the first variable is related to the length of the candidate video frame, and the second variable is related to the width of the candidate video frame.

In some possible designs, if the rotation angle is greater than 90 degrees and less than 360 degrees, the acquiring coordinates of each of the first vertexes in a two-dimensional rectangular coordinate system in accordance with a relation among the remainder, a length and a width of the background canvas area, a length and a width of the candidate video frame, a first variable, and a second variable comprises:

acquiring coordinates of a plurality of second vertexes in the two-dimensional rectangular coordinate system in accordance with the relation among the remainder, the length and the width of the background canvas area, the length and the width of the candidate video frame, the first variable, and the second variable; and performing coordinate mapping on the second vertexes in accordance with the rotation angle, to acquire the coordinates of each of the first vertexes in the two-dimensional rectangular coordinate system.

In some possible designs, if the rotation angle is less than 90 degrees, the acquiring coordinates of each of the first vertexes in a two-dimensional rectangular coordinate system in accordance with a relation among the remainder, a length and a width of the background canvas area, a length and a width of the candidate video frame, a first variable, and a second variable comprises: calculating the coordinates of each of the first vertexes in the two-dimensional rectangular coordinate system in accordance with the following expression:

$$\left\{ \begin{array}{ll} \left(\dfrac{\Delta w}{V'_w}, \dfrac{\Delta h + C_w \sin \alpha}{V'_h}\right) & \left(\dfrac{\Delta w + C_w \cos \alpha}{V'_w}, \dfrac{\Delta h}{V'_h}\right) \\ \left(\dfrac{\Delta w + C_h \sin \alpha}{V'_w}, \dfrac{V'_h - \Delta h}{V'_h}\right) & \left(\dfrac{V'_w - \Delta w}{V'_w}, \dfrac{\Delta h + C_h \cos \alpha}{V'_h}\right) \end{array} \right\}$$

wherein $C_w$ represents the length of the background canvas; $C_h$ represents the width of the background canvas; $\alpha$ represents the remainder; $V'_h$ represents the length of the candidate video frame; $V'_w$ represents the width of the candidate video frame; $\Delta w$ represents the second variable; and $\Delta h$ represents the first variable, and wherein $$\left(\frac{\Delta w}{V_w'}, \frac{\Delta h + C_w \sin \alpha}{V_h'}\right) \left(\frac{\Delta w + C_w \cos \alpha}{V_w'}, \frac{\Delta h}{V_h'}\right) \left(\frac{\Delta w + C_h \sin \alpha}{V_w'}, \frac{V_h' - \Delta h}{V_h'}\right),$$

$$\left(\frac{V_w' - \Delta w}{V_w'}, \frac{\Delta h + C_h \cos \alpha}{V_h'}\right)$$

represent the coordinates of each of the first vertexes in the two-dimensional rectangular coordinate system, respectively.

In some possible designs, the acquiring, in accordance with the rotation angle, a scaling parameter comprises:

performing a remainder operation on the rotation angle to acquire a remainder;

acquiring a length of the candidate video frame in accordance with a first variable and a relation between the remainder and each of a length and a width of the background canvas; and acquiring a width of the candidate video frame in accordance with a second variable and the relation between the remainder and each of the length and the width of the background canvas;

wherein the first variable is related to the length of the candidate video frame; the second variable is related to the width of the candidate video frame; and the scaling parameter comprises the length and the width of the candidate video frame.

In some possible designs, if the width of the candidate video frame is greater than the length of the candidate video frame, the first variable has a value of 0; and if the length of the candidate video frame is greater than the width of the candidate video frame, the second variable has a value of 0.

In a second aspect, the present disclosure provides an image processing apparatus, comprising:

an acquiring module configured to acquire a rotation instruction for a current video frame that is inputted by a user, wherein the rotation instruction comprises a rotation angle;

a first processing module configured to acquire a scaling parameter in accordance with the rotation angle, and perform scaling processing on an original background video frame corresponding to the current video frame in accordance with the scaling parameter to acquire a candidate video frame; and a second processing module configured to cut-out a target background video frame from the candidate video frame, and fill a background canvas area with the target background video frame; wherein two first vertexes on one diagonal line of the target background video frame are located on an edge of the candidate video frame, and two first vertexes on the other diagonal line of the target background video frame are located inside the candidate video frame.

In a third aspect, the present disclosure provides an electronic device, comprising: a memory and a processor;

wherein the memory is configured to store computer program instructions; and the processor is configured to execute the computer program instructions to implement the image processing method in accordance with any solution of the first aspect.

In a fourth aspect, an embodiment of the present disclosure further provides a non-transitory readable storage medium, comprising: computer program instructions, wherein the computer program instructions, when executed by a processor of an electronic device, cause the processor to implement the image processing method in accordance with any solution of the first aspect.

In a fifth aspect, an embodiment of the present disclosure further provides a computer program product having stored thereon a computer program which, when executed by a processor of an electronic device, causes the processor to implement the image processing method in accordance with any solution of the first aspect.

In a sixth aspect, the present disclosure further provides a computer program which, when executed by a processor of an electronic device, causes the processor to implement the image processing method in accordance with any solution of the first aspect.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or related art will be briefly described below, and it is apparent that for those of ordinary skill in the art, other drawings can also be acquired in accordance with these drawings without paying out creative efforts.

FIG. 1 is a flow diagram of an image processing method provided by an embodiment of the present disclosure;

FIG. 2a to FIG. 2b are schematic diagrams of position relations between first vertexes of a target background video frame and a candidate video frame provided by the present disclosure;

DETAILED DESCRIPTION

Figure 2B:
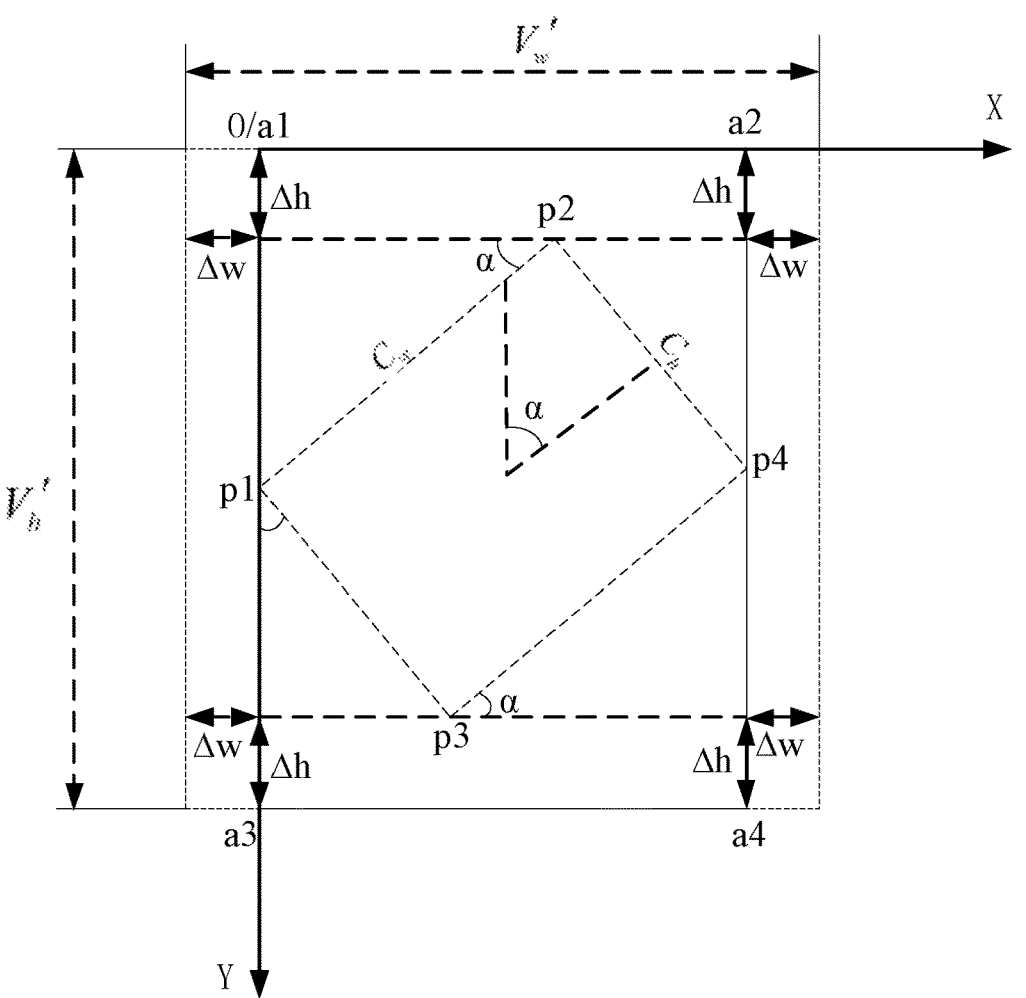

In order that the above objectives, features and advantages of the present disclosure may be more clearly understood, solutions of the present disclosure will be further described below. It should be noted that, in the case of no conflict, the embodiments of the present disclosure and the features in the embodiments may be combined with each other.

In the following description, numerous specific details are set forth in order to provide thorough understanding of the present disclosure, but the present disclosure may be implemented in other ways different from those described herein; and it is apparent that the embodiments in the description are only a few embodiments of the present disclosure, rather than all embodiments.

At present, an APP supports a user to perform a rotation with an arbitrary angle with respect to video content, then background content needs to be synchronously rotated along with the video content. In the case where the background content is synchronously rotated along with the video content, it is an urgent problem to be solved how to eliminate the existence of a blank area in an area for displaying the background content and preserve as much original background content as possible.

The embodiments of the present disclosure provide an image processing method and apparatus, an electronic device, a readable storage medium, and a program product, wherein in the method, a rotation instruction for a current video frame that is inputted by a user is acquired, wherein the rotation instruction comprises a rotation angle; a scaling parameter is acquired in accordance with the rotation angle, and scaling processing is performed on an original background video frame corresponding to the current video frame in accordance with the scaling parameter to acquire a candidate video frame; and then, a target background video frame is cut-out from the candidate video frame, and a background canvas area is filled with the target background video frame. Herein, when the target background video frame is cut-out, two first vertexes on one diagonal line of the target background video frame are located on an edge of the candidate video frame, and two first vertexes on the other diagonal line of the target background video frame are located inside the candidate video frame; in this way, on the basis that the video content is rotated and the background content is rotated synchronously, it is ensured that the background canvas area can be filled and the image content of the original background video frame is preserved to a maximum extent.

The image processing method provided by the present disclosure may be executed by the image processing apparatus, wherein the image processing apparatus may be implemented by any software and/or hardware. For example, the image processing apparatus may include, but is not limited to, an electronic device such as a tablet computer, a mobile phone (e.g., a foldable mobile phone, a large-screen mobile phone, etc.), a wearable device, a vehicle-mounted device, an augmented reality (AR)/virtual reality (VR) device, a notebook computer, an ultra-mobile personal computer (UMPC), a netbook, a personal digital assistant (PDA), a smart TV, a smart screen, a high definition TV, a 4K TV, a smart speaker, a smart projector, or the like. The present disclosure does not impose any limitation on the particular type of the image processing apparatus.

Herein, the present disclosure does not impose a limitation on a type of an operating system of the electronic device. For example, an Android system, a Linux system, a Windows system, an iOS system, etc.

FIG. 1 is a flow diagram of an image processing method provided by an embodiment of the present disclosure. The embodiment is described by taking an example that an electronic device performs the image processing method. Referring to FIG. 1, the method of the embodiment comprises:

S101, acquiring a rotation instruction for a current video frame that is inputted by a user, wherein the rotation instruction comprises a rotation angle.

Herein, the current video frame may be acquired after rotation processing is performed on an original video frame being edited. Or, the current video frame may also be an original video frame. The original video frame is determined in accordance with an imported image material and has not been rotated.

In this solution, a scaling parameter corresponding to an original background video frame is related to the rotation angle corresponding to the current video frame. Or, it can be understood that the scaling parameter corresponding to the original background video frame is acquired by calculation in accordance with the rotation angle corresponding to the current video frame. Therefore, the rotation angle indicated by the rotation instruction for the current video frame needs to be acquired.

In a possible implementation, the electronic device acquires the rotation instruction inputted by the user, wherein the rotation instruction is used for indicating that rotation processing is to be performed on the original video frame to acquire the current video frame; wherein the rotation instruction may comprise the rotation angle and a rotation direction.

Optionally, the rotation instruction may be inputted by the user by operating a touch screen of the electronic device, but it is not limited thereto.

Exemplarily, a rotation trajectory may be generated by the user's any two fingers simultaneously swiping on the touch screen, and the electronic device acquires the rotation angle and the rotation direction by analyzing the rotation trajectory. For example, by the user's thumb and index finger simultaneously rotating on a touch screen of a mobile phone (of course, other manners are also feasible), a first rotation trajectory corresponding to the thumb and a second rotation trajectory corresponding to the index finger are generated, respectively; and by analyzing the first rotation trajectory and the second rotation trajectory, a rotation direction and a rotation angle are acquired.

Exemplarily, the rotation instruction may also be inputted by the user by operating a corresponding control for implementing the rotation function that is provided on a user interface displayed by the electronic device. For example, the corresponding control for implementing the rotation function may be a rotation angle axis, and when the user drags a button on the rotation angle axis, the rotation angle may be increased or decreased, so that a rotation instruction is inputted to the electronic device.

The present disclosure does not limit the manner in which the user inputs the rotation instruction to the electronic device.

S102, acquiring, in accordance with the rotation angle, a scaling parameter which is used for performing scaling processing on an original background video frame corresponding to the current video frame to acquire a candidate video frame.

Herein, the original background video frame may be image content determined in accordance with a preset image material added by the user, wherein the preset image material includes, for example, a shot photo or a downloaded picture in the electronic device, etc.; or, the original background video frame may be acquired by processing the current video frame. The image content, image resolution, and other parameters of the original background video frame are not limited in the present disclosure.

In this embodiment, the scaling parameter may comprise a length and a width of the candidate video frame. An aspect ratio of the candidate video frame may be the same as that of the original background video frame.

In accordance with a possible implementation, the electronic device may acquire the length of the candidate video frame in accordance with a first variable and a relation between the rotation angle and each of a length and a width of a background canvas; and the electronic device may acquire the width of the candidate video frame in accordance with a second variable and the relation between the rotation angle and each of the length and the width of the background canvas.

The first variable is a variable related to the length of the candidate video frame; and the second variable is a variable related to the width of the candidate video frame.

Herein, the relation between the rotation angle and each of the length and the width of the background canvas includes a side-angle relation, for example, a sine or cosine relation.

Herein, with respect to the relation between the rotation angle and each of the length and the width of the background canvas, the first variable, the second variable, and interrelations among these parameters and the length and width of the candidate video frame, reference may be made to the detailed description hereinafter of the embodiments shown in FIG. 2a and FIG. 2b.

After the scaling parameter is acquired, by using a geometric central point of the original background video frame as a center, the scaling processing may be performed on the original background video frame in accordance with the scaling parameter to acquire the candidate video frame.

S103, cutting-out a target background video frame from the candidate video frame, and filling a background canvas area with the target background video frame; wherein two first vertexes on one diagonal line of the target background video frame are located on an edge of the candidate video frame, and two first vertexes on the other diagonal line of the target background video frame are located inside the candidate video frame.

Herein, the background canvas area is an area for displaying the background content, the video content is usually displayed on an upper layer of the background canvas area, and the size of the background canvas area may be greater than a size of the video content. An aspect ratio of the background canvas area may be the same as that of the original background video frame. In some cases, the length and the width of the background canvas area may be equal to the length and width of the original background video frame, respectively. The size of the background canvas area may be the same as that of the target background video frame, i.e., the length and width of the background canvas area may be the same as a length and a width of the target background video frame, respectively.

In order to ensure that no blank area exists in the background canvas area, in this solution, the first vertexes of the target background video frame are all overlapped with the candidate video frame, to ensure that the background canvas area can be filled with the cut-out target background video frame; further, in this solution, by overlapping two first vertexes on one diagonal line of the target background video frame with the edge of the candidate video frame, the image content of the original background video frame is preserved to a maximum extent.

In a possible implementation, the electronic device may calculate and determine a position of each of the first vertexes in the candidate video frame in accordance with a side-angle relation among two or more of the following parameters: the rotation angle, the length and the width of the background canvas area, the length and the width of the candidate video frame, the first variable, and the second variable; and determine an area for the target background video frame to be cut-out from the candidate video frame in accordance with the position of each of the first vertexes of the target background video frame. Texture data of the area for the target background video frame is extracted and the extracted texture data is filled into the background canvas area.

Herein, for a relation between the following parameters and each of the first vertexes, the parameters are the rotation angle, the length and width of the background canvas area, the length and width of the candidate video frame, the first variable, and the second variable, reference may be made to the detailed description hereinafter of the embodiments shown in FIG. 2a and FIG. 2b.

In this embodiment, a rotation instruction for a current video frame that is inputted by a user is acquired, wherein the rotation instruction comprises a rotation angle; a scaling parameter is acquired in accordance with the rotation angle, and scaling processing is performed on an original background video frame corresponding to the current video frame in accordance with the scaling parameter to acquire a candidate video frame; and a target background video frame is cut-out from the candidate video frame, and the background canvas area is filled with the target background video frame. Herein, when the target background video frame is cut-out, two first vertexes on one diagonal line of the target background video frame are located on an edge of the candidate video frame, and two first vertexes on the other diagonal line of the target background video frame are located inside the candidate video frame; in this way, on the basis that the video content is rotated and the background content is rotated synchronously, it is ensured that the background canvas area can be filled and the image content of the original background video frame is preserved to a maximum extent.

On the basis of the embodiment shown in FIG. 1, next, exemplarily, the image processing method provided by the embodiment of the present disclosure will be described in detail by taking the background canvas area being a right-angle parallelogram as an example.

It should be noted that, when the background canvas area is a right-angle parallelogram, the target background video frame may be a right-angle parallelogram with the same size as the background canvas area.

For example, the background canvas area is a rectangle area, and has a pixel size of 1500*1015, then the target background video frame to be cut-out is also a rectangle and has the pixel size of 1500*1015.

Below, in conjunction with the embodiments shown in FIG. 2a and FIG. 2b and steps a to d, it is exemplarily described how to determine a position of each of the first vertexes of the target background video frame in the candidate video frame:

Step a, a rotation instruction inputted by a user is acquired, and a rotation angle $\alpha'$ is acquired in accordance with the rotation instruction.

Herein, the rotation instruction may be acquired by using the method in the embodiment shown in FIG. 1, and of course, may also be acquired by using other methods, which are not repeated herein for brevity.

Step b, a remainder operation is performed on the rotation angle $\alpha'$ to acquire a remainder $\alpha$; and calculation is performed in accordance with formula (1) to acquire a scaling parameter.

Specifically, a first remainder operation is performed on the rotation angle $\alpha'$ to acquire a remainder $\alpha''$, wherein in the first remainder operation, a divisor is 360 degrees; next, a second remainder operation is performed on the remainder $\alpha''$ to acquire the remainder $\alpha$, wherein the divisor is 90 degrees in the second remainder operation.

Since the rotation periodically varies by 360 degrees, for example, rotating the original video frame by 360 degrees is equivalent to rotating the original video frame by 0 degree. Therefore, in this solution, the first remainder operation is performed by using 360 degrees as the divisor.

In this solution, next, the second remainder operation is performed by using 90 degrees as the divisor, and a value range of the remainder $\alpha$ is [0, 90], to ensure that when the value of the remainder $\alpha$ is substituted into the subsequent formulas (1) and (2) for sine and cosine operations, correct calculation results can be acquired.

Herein, formula (1) is as follows:

$$C_w \cos\alpha + C_h \sin\alpha + 2\Delta w = V'_w \qquad \text{Formula (1)}$$

$$C_w \sin\alpha + C_h \cos\alpha + 2\Delta h = V'_h$$

In the formula (1), $C_w$ represents the length of the background canvas area; $C_h$ represents the width of the background canvas area; $V'_h$ represents the length of the candidate video frame; $V'_w$ represents the width of the candidate video frame;

$$\frac{V'_h}{V'_w} = k,$$

and k is a constant greater than 0; $\Delta h$ represents the first variable related to the length of the candidate video frame; and $\Delta w$ represents the second variable related to the width of the candidate video frame.

It should be noted that a value of k may be determined in accordance with the aspect ratio of the original background video frame. For example, the value of k is determined by a formula, $$k = \frac{V_h}{V_w},$$

wherein $V_h$ represents the length of the original background video frame and $V_w$ represents the width of the original background video frame.

Optionally, if the width $V'_w$ of the candidate video frame is greater than the length $V'_h$ of the candidate video frame, then $\Delta h=0$; and, if the length $V'_h$ of the candidate video frame is greater than the width $V'_w$ of the candidate video frame, then $\Delta w=0$.

From the above description, it can be seen that the candidate video frame in this solution is acquired by performing proportional scaling on the original background video frame, so that if the length of the original background video frame is greater than the width thereof, the length of the candidate video frame is greater than the width thereof; and if the length of the original background video frame is less than the width thereof, the length of the original background video frame is less than the width thereof.

It should be noted that, in this solution, for the candidate video frame, the length indicates a side in a vertical direction, and the width indicates a side in a horizontal direction.

Step c, scaling processing is performed on the original background video frame in accordance with the scaling parameter to acquire the candidate video frame.

Step d, coordinates of each of the first vertexes in an XOY rectangular coordinate system are acquired in accordance with a relation among the remainder $\alpha$, the length and the width of the background canvas area, the length and the width of the candidate video frame, the first variable, and the second variable, wherein the XOY rectangular coordinate system is established in accordance with the candidate video frame.

Herein, the XOY rectangular coordinate system is a two-dimensional rectangular coordinate system and is established in accordance with the length and width sides of the candidate video frame.

Exemplarily, assuming that when the rotation angle is 0 degree or 360 degrees or an integer multiple of 360 degrees, which is equivalent to no rotation, referring to FIG. 2a, four vertexes of the candidate video frame are a1, a2, a3, a4, respectively, and a horizontal coordinate axis (X axis) of the XOY rectangular coordinate system may be determined in accordance with the width side of the candidate video frame, and a vertical coordinate axis (Y axis) of the XOY rectangular coordinate system may be determined in accordance with the length side of the candidate video frame.

Specifically, referring to FIG. 2a, an origin of the XOY rectangular coordinate system is a vertex a1 of the candidate video frame; a positive direction of the X axis is rightward in a horizontal direction, i.e., in a direction from a1 to a2; and a positive direction of the Y axis is downward in a vertical direction, i.e., in a direction from a1 to a3.

It should be noted that, the establishment of the two-dimensional rectangular coordinate system is not limited to the length and width sides perpendicular to each other shown in FIG. 2a and FIG. 2b, for example, the two-dimensional rectangular coordinate system may also be established by using a side of a3 to a4 and a side of a3 to a1.

Still referring to FIG. 2a, on the basis of the XOY rectangular coordinate system shown in FIG. 2a, the side-angle relation between the parameters, which are the remainder $\alpha$, the length and width of the background canvas area, the length and width of the candidate video frame, the first variable, and the second variable, and each of the first vertexes directly or indirectly satisfy formula (2).

Exemplarily, the formula (2) is as follows:

$$\left( \begin{array}{cc} \left(\dfrac{\Delta w}{V'_w}, \dfrac{\Delta h + C_w \sin\alpha}{V'_h}\right) & \left(\dfrac{\Delta w + C_w \cos\alpha}{V'_w}, \dfrac{\Delta h}{V'_h}\right) \\ \left(\dfrac{\Delta w + C_h \sin\alpha}{V'_w}, \dfrac{V'_h - \Delta h}{V'_h}\right) & \left(\dfrac{V'_w - \Delta w}{V'_w}, \dfrac{\Delta h + C_h \cos\alpha}{V'_h}\right) \end{array} \right) \quad \text{Formula (2)}$$

The parameters in the formula (2) have the same meanings as the parameters in the formula (1), and reference can be made to the detailed description above, which is not repeated herein.

In the formula (2), $$\frac{\Delta w}{V'_w}$$

represents a coordinate of a vertex p1 on the X axis;

$$\frac{\Delta h + C_w \sin\alpha}{V'_h}$$

represents a coordinate of the vertex p1 on the Y axis;

$$\frac{\Delta w + C_w \cos\alpha}{V'_w}$$

represents a coordinate of a vertex p2 on the X axis;

$$\frac{\Delta h}{V'_h}$$

represents a coordinate of the vertex p2 on the Y axis;

$$\frac{\Delta w + C_h \sin\alpha}{V'_w}$$

represents a coordinate of a vertex p3 on the X axis;

$$\frac{V'_h - \Delta h}{V'_h}$$

represents a coordinate of the vertex p3 on the Y axis;

$$\frac{V'_w - \Delta w}{V'_w}$$

represents a coordinate of a vertex p4 on the X axis; and $$\frac{\Delta h + C_h \cos\alpha}{V'_h}$$

represents a coordinate of the vertex p4 on the Y axis.

It should be noted that in this solution, the coordinates of the vertexes p1 to p4 acquired by calculation have been subjected to normalization processing. And the coordinates of the vertexes a1, a2, a3, and a4 of the candidate video frame in the XOY rectangular coordinate system may be denoted as a1=(0, 0), a2=(1, 0), a3=(0, 1), and a4=(1, 1), respectively.

In a practical application, the coordinates of each of the vertexes a1, a2, a3, and a4 of the candidate video frame in the XOY rectangular coordinate system and the coordinates of the vertexes p1 to p4 may also not be subjected to the normalization processing.

Assuming that the four first vertexes corresponding to the target background video frame are sequentially denoted as: r1, r2, r3, and r4.

Reference is made to FIG. 2b, which exemplarily shows position relations between the four first vertexes of the target background video frame and the candidate video frame when the rotation angle $0° < \alpha' < 90°$.

In conjunction with FIGS. 2a and 2b, when the rotation angle $0° \le a' \le 90°$, the first vertexes of the target background video frame directly satisfy the formula (2), that is, the above vertexes p1 to p4 respectively correspond to the four first vertexes corresponding to the target background video frame, i.e., r1=p1, r2=p2, r3=p3, and r4=p4.

When the rotation angle $90° < \alpha' < 360°$, the first vertexes of the target background video frame indirectly satisfy the formula (2). Specifically, when the rotation angle $90° < \alpha' < 360°$, the vertexes p1 to p4 are acquired by being calculated in accordance with the formula (2), and coordinate mapping is further needed to be performed on the vertexes p1 to p4 in the XOY rectangular coordinate system, respectively, so as to acquire the positions of the four first vertexes corresponding to the target background video frame in the candidate video frame.

It is assumed that the vertexes p1 to p4 are denoted as a matrix of 2*2 in a form of a matrix, as shown in formula (3):

$$\begin{pmatrix} (p1_x, p1_y) & (p2_x, p2_y) \\ (p3_x, p3_y) & (p4_x, p4_y) \end{pmatrix} \qquad \text{Formula (3)}$$

In the formula (3), when a subscript is x, an X-axis coordinate value is represented, and when a subscript is y, a Y-axis coordinate value is represented.

Specifically, when the rotation angle $90° < \alpha' < 360°$, the rotation angle can be further subdivided into three cases of $90° < \alpha' < 180°$, $180° < \alpha' 270°$, and $270° < \alpha' < 360°$, and it will be described in detail how to perform coordinate mapping on the vertexes p1 to p4 to determine the positions of the first vertexes.

(a) When the rotation angle is $90° < \alpha' < 180°$, the coordinate mapping is respectively performed on the vertexes p1 to p4, and the acquired result can be represented by formula (4):

$$\begin{pmatrix} (p2_x, p2_y) & (p4_x, p4_y) \\ (p1_x, p1_y) & (p3_x, p3_y) \end{pmatrix} \qquad \text{Formula (4)}$$

Herein, in conjunction with the formula (4), it can be seen that r1=p2, r2=p4, r3=p1, and r4=p3.

(b) When the rotation angle is $180° < \alpha' < 270°$, the coordinate mapping is respectively performed on the vertexes p1 to p4, and the acquired result can be represented by formula (5):

$$\begin{pmatrix} (p4_x, p4_y) & (p3_x, p3_y) \\ (p2_x, p2_y) & (p1_x, p1_y) \end{pmatrix} \qquad \text{Formula (5)}$$

Herein, in conjunction with the formula (5), it can be seen that r1=p4, r2=p3, r3=p2, and r4=p1.

(c) When the rotation angle is $270° < \alpha' < 360°$, the coordinate mapping is respectively performed on the vertexes p1 to p4, and the acquired result can be represented by formula (6):

$$\begin{pmatrix} (p3_x, p3_y) & (p1_x, p1_y) \\ (p4_x, p4_y) & (p2_x, p2_y) \end{pmatrix} \qquad \text{Formula (6)}$$

Herein, in conjunction with the formula (6), it can be seen that r1=p3, r2=p1, r3=p4, and r4=p2.

In conjunction with the above three cases and the formulas (4) to (6), in this solution, the coordinate mapping is performed on the vertexes p1 to p4, which is equivalent to performing a rotation transformation on the matrix represented by the formula (3).

The method provided in this embodiment is to acquire the position of each of the first vertexes in the candidate video frame by calculating the coordinates, so that in a practical application, resource consumption caused by the calculation using the formulas is low, which can effectively improve the image processing efficiency.

After the position of each of the first vertexes in the candidate video frame is acquired by the method shown in the above steps a to d, texture data in a corresponding area may be extracted, and the extracted texture data may be filled into the background canvas area.

In a practical application, due to the continuity of the video frames in the video, if the user continuously rotates the original video content, the above process can be correspondingly performed for each video frame, thereby ensuring that the background content corresponding to each video frame in the video is synchronously rotated along with the video content, and ensuring that the background canvas area can be filled and the image content of the original background video frame is preserved to a maximum extent.

Exemplarily, the present disclosure further provides an image processing apparatus.

Figure 3:
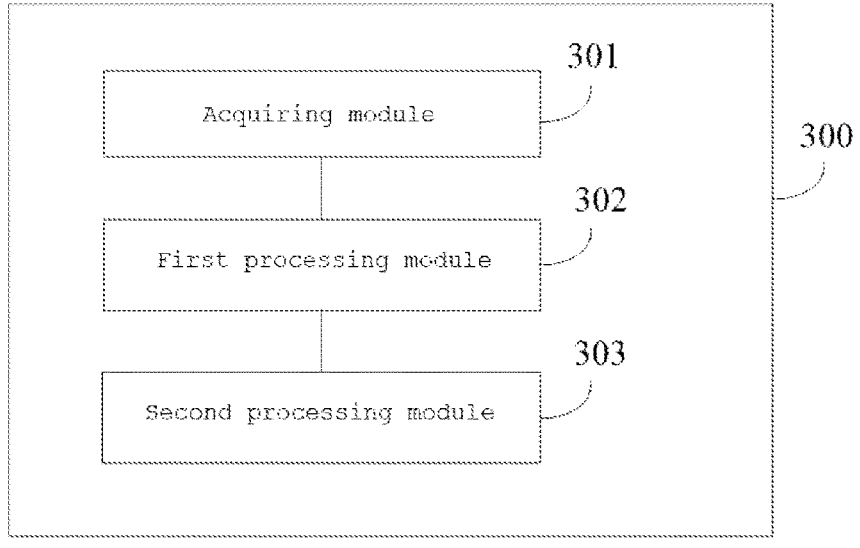
FIG. 3 is a schematic structural diagram of an image processing apparatus provided by an embodiment of the present disclosure.

FIG. 3 is a schematic structural diagram of an image processing apparatus in accordance with an embodiment of the present disclosure. Referring to FIG. 3, the image processing apparatus 300 in accordance with this embodiment comprises:

an acquiring module 301 configured to acquire a rotation instruction for a current video frame that is inputted by a user, wherein the rotation instruction comprises a rotation angle.

A first processing module 302 configured to acquire a scaling parameter in accordance with the rotation angle; and perform scaling processing on an original background video frame corresponding to the current video frame in accordance with the scaling parameter to acquire a candidate video frame.

A second processing module 303 configured to cut-out a target background video frame from the candidate video frame, and fill the background canvas area with the target background video frame; wherein two first vertexes on one diagonal line of the target background video frame are located on an edge of the candidate video frame, and two first vertexes on the other diagonal line of the target background video frame are located inside the candidate video frame.

In some possible designs, the second processing module 303 is specifically configured to acquire a position of each of the first vertexes of the target background video frame in the candidate video frame in accordance with the rotation angle; and cut-out the target background video frame from the candidate video frame in accordance with the position of each of the first vertexes in the candidate video frame.

In some possible designs, the second processing module 303 is specifically configured to perform a remainder operation on the rotation angle to acquire a remainder; and acquire coordinates of each of the first vertexes in a two-dimensional rectangular coordinate system in accordance with a relation among the remainder, a length and a width of the background canvas area, a length and a width of the candidate video frame, a first variable, and a second variable; wherein the two-dimensional rectangular coordinate system is established in accordance with the candidate video frame.

Herein, the first variable is related to the length of the candidate video frame, and the second variable is related to the width of the candidate video frame.

In some possible designs, if the rotation angle is greater than 90 degrees and less than 360 degrees, the second processing module 303 is specifically configured to: acquire coordinates of a plurality of second vertexes in the two-dimensional rectangular coordinate system in accordance with the relation among the remainder, the length and the width of the background canvas area, the length and the width of the candidate video frame, the first variable, and the second variable; and perform coordinate mapping on the second vertexes in accordance with the rotation angle, to acquire the coordinates of each of the first vertexes in the two-dimensional rectangular coordinate system.

In some possible designs, if the rotation angle is less than 90 degrees, the second processing module 303 is specifically configured to: calculate the coordinates of each of the first vertexes in the two-dimensional rectangular coordinate system in accordance with the following expression:

$$\left( \begin{array}{cc} \left(\dfrac{\Delta w}{V'_w}, \dfrac{\Delta h + C_w \sin\alpha}{V'_h}\right) & \left(\dfrac{\Delta w + C_w \cos\alpha}{V'_w}, \dfrac{\Delta h}{V'_h}\right) \\ \left(\dfrac{\Delta w + C_h \sin\alpha}{V'_w}, \dfrac{V'_h - \Delta h}{V'_h}\right) & \left(\dfrac{V'_w - \Delta w}{V'_w}, \dfrac{\Delta h - C_h \cos\alpha}{V'_h}\right) \end{array} \right)$$

wherein $C_w$ represents the length of the background canvas area; $C_h$ represents the width of the background canvas area; $\alpha$ represents the remainder; $V'_h$ represents the length of the candidate video frame; $V'_w$ represents the width of the candidate video frame; $\Delta w$ represents the second variable; and $\Delta h$ represents the first variable, and wherein $$\left(\dfrac{\Delta w}{V'_w}, \dfrac{\Delta h + C_w \sin\alpha}{V'_h}\right), \left(\dfrac{\Delta w + C_w \cos\alpha}{V'_w}, \dfrac{\Delta h}{V'_h}\right),$$

$$\left(\dfrac{\Delta w + C_h \sin\alpha}{V'_w}, \dfrac{V'_h - \Delta h}{V'_h}\right), \left(\dfrac{V'_w - \Delta w}{V'_w}, \dfrac{\Delta h + C_h \cos\alpha}{V'_h}\right)$$

represent the coordinates of each of the first vertexes in the two-dimensional rectangular coordinate system, respectively.

In some possible designs, the first processing module 302 is specifically configured to: perform a remainder operation on the rotation angle to acquire a remainder; acquire a length of the candidate video frame in accordance with a first variable and a relation between the remainder and each of a length and a width of the background canvas area; and acquire a width of the candidate video frame in accordance with a second variable and the relation between the remainder and each of the length and the width of the background canvas area.

Herein, the first variable is related to the length of the candidate video frame; the second variable is related to the width of the candidate video frame; and the scaling parameter comprises the length and the width of the candidate video frame.

In some possible designs, if the width of the candidate video frame is greater than the length of the candidate video frame, the first variable has a value of 0; and if the length of the candidate video frame is greater than the width of the candidate video frame, the second variable has a value of 0.

The image processing apparatus provided in this embodiment may be used for performing the technical solution shown in any of the above method embodiments, and the implementation principle and the technical effects thereof are similar to those of the method embodiments, which are not repeated herein; for the details, please refer to the description of the above method embodiments.

Figure 4:
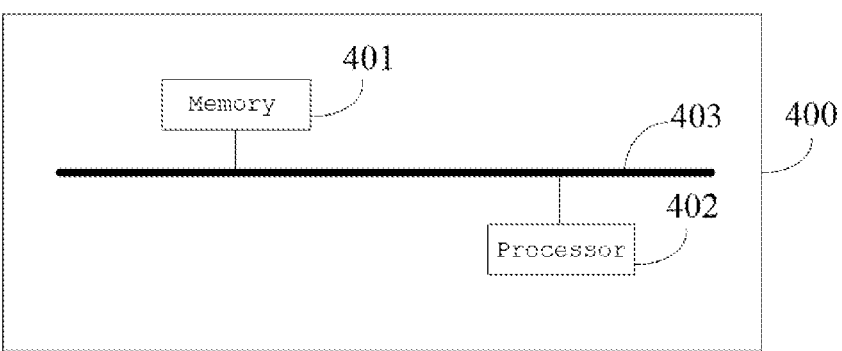
FIG. 4 is a schematic structural diagram of an electronic device provided by an embodiment of the present disclosure.

FIG. 4 is a schematic structural diagram of an electronic device in accordance with an embodiment of the present disclosure. Referring to FIG. 4, the electronic device 400 provided in this embodiment comprises: a memory 401 and a processor 402.

Herein, the memory 401 may be a separate physical unit, and may be connected with the processor 402 via a bus 403. The memory 401 and the processor 402 may also be integrated together, implemented by hardware, etc.

The memory 401 is configured to store program instructions, which are invoked by the processor 402 to perform the operations of any of the above method embodiments.

Optionally, when part or all of the method of the above embodiment is implemented by software, the electronic device 400 may also include only the processor 402. The memory 401 for storing programs is located outside the electronic device 400, and the processor 402 is connected with the memory via circuits/wires for reading and executing the programs stored in the memory.

The processor 402 may be a central processing unit (CPU), a network processor (NP), or a combination of the CPU and NP.

The processor 402 may further include a hardware chip. The above hardware chip may be an application-specific integrated circuit (ASIC), a programmable logic device (PLD), or a combination thereof. The above PLD may be a complex programmable logic device (CPLD), a field-programmable gate array (FPGA), a general array logic (GAL), or any combination thereof.

The memory 401 may include a volatile memory, for example, a random-access memory (RAM); the memory may also include a non-volatile memory, for example, a flash memory, a hard disk drive (HDD), or a solid-state drive (SSD); and the memory may further include a combination of the above kinds of memories.

The present disclosure further provides a non-transitory computer-readable storage medium (also referred to as readable storage medium) comprising computer program instructions which, when executed by at least one processor of an electronic device, cause the at least one processor to perform the technical solution in accordance with any of the above method embodiments.

The present disclosure further provides a program product comprising a computer program stored in a readable storage medium, and at least one processor of an electronic device can read the computer program from the readable storage medium, and the at least one processor executes the computer program so that the electronic device performs the technical solution in accordance with any of the above method embodiments.

It should be noted that, herein, relational terms such as "first" and "second", are only used for distinguishing one entity or operation from another entity or operation without necessarily requiring or implying any such actual relation or order between these entities or operations. Moreover, the term "include", "comprise", or any other variation thereof, is intended to encompass a non-exclusive inclusion, such that a process, method, article, or device including a list of elements includes not only those elements but also other elements not expressly listed, or elements inherent to such a process, method, article, or device. Without more limitations, an element defined by a statement "including one . . . " does not exclude the presence of another identical element in the process, method, article, or device that includes the element.

The above contents are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. An image processing method, comprising:
   acquiring an instruction for rotating video content, wherein the instruction comprises a rotation angle, and wherein the video content comprises at least one video content frame displayed over an original background video frame;
   determining, based on the rotation angle, a scaling parameter;
   performing scaling processing on the original background video frame using the scaling parameter to acquire a candidate background video frame;
   cutting-out a target background video frame from the candidate background video frame, wherein the target background video frame comprises a first set of opposing vertices and a second set of opposing vertices, and wherein the first set of opposing vertexes are located on at least one edge of the candidate background video frame, and the second set of opposing vertexes are located inside the candidate background video frame; and
   filling a background canvas area with the target background video frame, wherein the background canvas area displays background content of the rotated video content; and
   displaying the rotated at least one video content frame in an upper layer of the filled background canvas area.

2. The method according to claim 1, wherein the cutting-out a target background video frame from the candidate background video frame comprises:
   acquiring a position of each vertex of the second set of vertices of the target background video frame in the candidate background video frame in accordance with the rotation angle; and
   cutting-out the target background video frame from the candidate background video frame in accordance with the position of each vertex of the second set of vertices in the candidate background video frame.

3. The method according to claim 2, wherein the acquiring a position of each vertex of the second set of vertices of the target background video frame in the candidate background video frame in accordance with the rotation angle comprises:
   performing a remainder operation on the rotation angle to acquire a remainder; and
   acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable;
   wherein the two-dimensional rectangular coordinate system is established in accordance with the candidate background video frame; and the first variable is related to the length of the candidate background video frame, and the second variable is related to the width of the candidate background video frame.

4. The method according to claim 3, wherein if the rotation angle is greater than 90 degrees and less than 360 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:
   acquiring coordinates of a plurality of second vertexes in the two-dimensional rectangular coordinate system in accordance with the relation among the remainder, the length and the width of the background canvas area, the length and the width of the candidate background video frame, the first variable, and the second variable; and performing coordinate mapping on each of the second vertexes in accordance with the rotation angle, to acquire the coordinates of each vertex of the second set of vertices in the two-dimensional rectangular coordinate system.

5. The method according to claim 3, wherein if the rotation angle is less than or equal to 90 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:

acquiring the coordinates of each vertex of the second set of vertices in the two-dimensional rectangular coordinate system, in accordance with a side-angle relation between the remainder and each of the length and the width of the background canvas area, and relations among values representing the side-angle relation, the first variable, the second variable, and the length and the width of the candidate background video frame.

6. The method according to claim 3, wherein if the width of the candidate background video frame is greater than the length of the candidate background video frame, the first variable has a value of 0; and if the length of the candidate background video frame is greater than the width of the candidate background video frame, the second variable has a value of 0.

7. The method according to claim 1, wherein the determining, based on the rotation angle, a scaling parameter comprises:

performing a remainder operation on the rotation angle to acquire a remainder;

acquiring a length of the candidate background video frame in accordance with a first variable and a relation between the remainder and each of a length and a width of the background canvas; and acquiring a width of the candidate background video frame in accordance with a second variable and the relation between the remainder and each of the length and the width of the background canvas;

wherein the first variable is related to the length of the candidate background video frame; the second variable is related to the width of the candidate background video frame; and the scaling parameter comprises the length and the width of the candidate background video frame.

8. An electronic device, comprising: a memory and a processor;

wherein the memory is configured to store computer program instructions; and the processor is configured to execute the computer program instructions to implement operations for image processing, the operations comprising:

acquiring an instruction for rotating video content, wherein the instruction comprises a rotation angle, and wherein the video content comprises at least one video content frame displayed over an original background video frame;

determining, based on the rotation angle, a scaling parameter;

performing scaling processing on the original background video frame using the scaling parameter to acquire a candidate background video frame;

cutting-out a target background video frame from the candidate background video frame, wherein the target background video frame comprises a first set of opposing vertices and a second set of opposing vertices, and wherein the first set of opposing vertexes are located on at least one edge of the candidate background video frame, and the second set of opposing vertices are located inside the candidate background video frame; and filling a background canvas area with the target background video frame, wherein the background canvas area displays background content of the rotated video content; and displaying the rotated at least one video content frame in an upper layer of the filled background canvas area.

9. The electronic device according to claim 8, wherein the cutting-out a target background video frame from the candidate background video frame comprises:

acquiring a position of each vertex of the second set of vertices of the target background video frame in the candidate background video frame in accordance with the rotation angle; and cutting-out the target background video frame from the candidate background video frame in accordance with the position of each vertex of the second set of vertices in the candidate background video frame.

10. The electronic device according to claim 9, the acquiring a position of each vertex of the second set of vertices of the target background video frame in the candidate background video frame in accordance with the rotation angle comprises:

performing a remainder operation on the rotation angle to acquire a remainder; and acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable;

wherein the two-dimensional rectangular coordinate system is established in accordance with the candidate background video frame; and the first variable is related to the length of the candidate background video frame, and the second variable is related to the width of the candidate background video frame.

11. The electronic device according to claim 10, wherein if the rotation angle is greater than 90 degrees and less than 360 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:

acquiring coordinates of a plurality of second vertexes in the two-dimensional rectangular coordinate system in accordance with the relation among the remainder, the length and the width of the background canvas area, the length and the width of the candidate background video frame, the first variable, and the second variable; and performing coordinate mapping on each of the second vertexes in accordance with the rotation angle, to acquire the coordinates of each vertex of the second set of vertices in the two-dimensional rectangular coordinate system.

12. The electronic device according to claim 10, wherein if the rotation angle is less than or equal to 90 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:

acquiring the coordinates of each vertex of the second set of vertices in the two-dimensional rectangular coordinate system, in accordance with a side-angle relation between the remainder and each of the length and the width of the background canvas area, and relations among values representing the side-angle relation, the first variable, the second variable, and the length and the width of the candidate background video frame.

13. The electronic device according to claim 10, wherein if the width of the candidate background video frame is greater than the length of the candidate background video frame, the first variable has a value of 0; and if the length of the candidate background video frame is greater than the width of the candidate background video frame, the second variable has a value of 0.

14. The electronic device according to claim 8, wherein the determining, based on the rotation angle, a scaling parameter comprises:

performing a remainder operation on the rotation angle to acquire a remainder;

acquiring a length of the candidate background video frame in accordance with a first variable and a relation between the remainder and each of a length and a width of the background canvas; and acquiring a width of the candidate background video frame in accordance with a second variable and the relation between the remainder and each of the length and the width of the background canvas;

wherein the first variable is related to the length of the candidate background video frame; the second variable is related to the width of the candidate background video frame; and the scaling parameter comprises the length and the width of the candidate background video frame.

15. A non-transitory readable storage medium, comprising: computer program instructions, wherein the computer program instructions, when executed by at least one processor of an electronic device, cause the at least one processor to implement operations for image processing, the operations comprising:

acquiring an instruction for rotating video content, wherein the instruction comprises a rotation angle, and wherein the video content comprises at least one video content frame displayed over an original background video frame;

determining, based on the rotation angle, a scaling parameter which is used for;

performing scaling processing on the original background video frame using the scaling parameter to acquire a candidate background video frame;

cutting-out a target background video frame from the candidate background video frame, wherein the target background video frame comprises a first set of opposing vertices and a second set of opposing vertices, and wherein the first set of opposing vertexes are located on at least one edge of the candidate background video frame, and the second set of opposing vertexes are located inside the candidate background video frame; and filling a background canvas area with the target background video frame, wherein the background canvas area displays background content of the rotated video content; and displaying the rotated at least one video content frame in an upper layer of the filled background canvas area.

16. The non-transitory readable storage medium according to claim 15, wherein the cutting-out a target background video frame from the candidate background video frame comprises:

acquiring a position of each vertex of the second set of vertices of the target background video frame in the candidate background video frame in accordance with the rotation angle; and cutting-out the target background video frame from the candidate background video frame in accordance with the position of each vertex of the second set of vertices in the candidate background video frame.

17. The non-transitory readable storage medium according to claim 16, wherein the acquiring a position of each vertex of the second set of vertices of the target background video frame in the candidate background video frame in accordance with the rotation angle comprises:

performing a remainder operation on the rotation angle to acquire a remainder; and acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable;

wherein the two-dimensional rectangular coordinate system is established in accordance with the candidate background video frame; and the first variable is related to the length of the candidate background video frame, and the second variable is related to the width of the candidate background video frame.

18. The non-transitory readable storage medium according to claim 17, wherein if the rotation angle is greater than 90 degrees and less than 360 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:

acquiring coordinates of a plurality of second vertexes in the two-dimensional rectangular coordinate system in accordance with the relation among the remainder, the length and the width of the background canvas area, the length and the width of the candidate background video frame, the first variable, and the second variable; and performing coordinate mapping on each of the second vertexes in accordance with the rotation angle, to acquire the coordinates of each vertex of the second set of vertices in the two-dimensional rectangular coordinate system.

19. The non-transitory readable storage medium according to claim 17, wherein if the rotation angle is less than or equal to 90 degrees, the acquiring coordinates of each vertex of the second set of vertices in a two-dimensional rectangular coordinate system in accordance with a relation among the remainder, a length and a width of the background canvas area, a length and a width of the candidate background video frame, a first variable, and a second variable comprises:

acquiring the coordinates of each vertex of the second set of vertices in the two-dimensional rectangular coordinate system, in accordance with a side-angle relation between the remainder and each of the length and the width of the background canvas area, and relations among values representing the side-angle relation, the first variable, the second variable, and the length and the width of the candidate background video frame.

20. The non-transitory readable storage medium according to claim 15, wherein the determining, based on the rotation angle, a scaling parameter comprises:

performing a remainder operation on the rotation angle to acquire a remainder;

acquiring a length of the candidate background video frame in accordance with a first variable and a relation between the remainder and each of a length and a width of the background canvas; and acquiring a width of the candidate background video frame in accordance with a second variable and the relation between the remainder and each of the length and the width of the background canvas;

wherein the first variable is related to the length of the candidate background video frame; the second variable is related to the width of the candidate background video frame; and the scaling parameter comprises the length and the width of the candidate background video frame.

* * * * *